US012568009B2

(12) United States Patent
Schrattenecker et al.

(10) Patent No.: US 12,568,009 B2
(45) Date of Patent: Mar. 3, 2026

(54) ELECTRONIC DEVICES WITH STANDARD-COMPLIANT SENSING CAPABILITIES

(71) Applicant: Apple Inc., Cupertino, CA (US)

(72) Inventors: Jochen Schrattenecker, Alberndorf in der Riedmark (AT); Michael Hofstadler, Luftenberg (AT); Andreas Springer, Linz (AT); Reinhard Feger, Linz (AT); Andreas Stelzer, Linz (AT); Harald Pretl, Schwertberg (AT); Bernhard Sogl, Unterhaching (DE); Andreas Menkhoff, Oberhaching (DE)

(73) Assignee: Apple Inc., Cupertino, CA (US)

(*) Notice: Subject to any disclaimer, the term of this patent is extended or adjusted under 35 U.S.C. 154(b) by 463 days.

(21) Appl. No.: 18/167,017

(22) Filed: Feb. 9, 2023

(65) Prior Publication Data

US 2023/0327929 A1      Oct. 12, 2023

Related U.S. Application Data

(60) Provisional application No. 63/323,413, filed on Mar. 24, 2022.

(51) Int. Cl.
*H04L 27/26*        (2006.01)
*G01S 7/4865*      (2020.01)
*G01S 17/66*        (2006.01)

(52) U.S. Cl.
CPC ........ *H04L 27/2605* (2013.01); *G01S 7/4865* (2013.01); *G01S 17/66* (2013.01)

(58) Field of Classification Search
CPC ..... H04L 27/2605; G01S 7/4865; G01S 17/66
See application file for complete search history.

(56) References Cited

U.S. PATENT DOCUMENTS

2016/0315640 A1* 10/2016 Hirsch ................... H04L 5/143
2017/0033899 A1*  2/2017 Rakib ................ H04L 27/2655
(Continued)

FOREIGN PATENT DOCUMENTS

EP        4152041 A1      3/2023

OTHER PUBLICATIONS

Junfeng Guan et al., 3-D Imaging Using Millimeter-Wave 5G Signal Reflections, IEEE Transactions on Microwave Theory and Techniques, Jun. 2021, pp. 2936-2948, vol. 69, No. 6, IEEE Xplore.

*Primary Examiner* — Duc C Ho
(74) *Attorney, Agent, or Firm* — Treyz Law Group, P.C.; Michael H. Lyons

(57) ABSTRACT

An electronic device may include wireless circuitry that conveys data with a base station according to a communication standard and that detects range to an external object using a first antenna that transmits a waveform compliant with the standard. The waveform may be a Sounding Reference Signal (SRS) waveform, a transmit data waveform, or another waveform. A second antenna may receive a reflected signal that includes the transmitted waveform. The communications circuitry may perform element-wise division on symbols of a selected sub-carrier in the reflected signal using corresponding phases and magnitudes of a set of complex OFDM symbols used to generate the transmitted waveform. Peak detection may be performed to detect the range. Using standard-compliant transmit waveforms to also perform spatial ranging may allow the communications circuitry to avoid dedicated radar circuitry while also minimizing impact to the transfer of the data.

20 Claims, 5 Drawing Sheets

(56)          References Cited

U.S. PATENT DOCUMENTS

| | | | |
|---|---|---|---|
| 2019/0285722 A1* | 9/2019 | Markhovsky | G01S 1/042 |
| 2020/0404598 A1* | 12/2020 | Landis | H04W 52/367 |
| 2021/0076367 A1 | 3/2021 | Bayesteh et al. | |
| 2021/0392516 A1* | 12/2021 | Park | H04L 5/0048 |
| 2023/0089794 A1* | 3/2023 | Behnamfar | H04W 52/367 370/329 |

* cited by examiner

110

| STANDARD-COMPLIANT TRANSMIT WAVEFORMS USED FOR RANGING |
|---|
| SRS |
| TX_DATA |
| DMRS |
| PTRS |
| CSI-RS |
| ⋮ |

*FIG. 3*

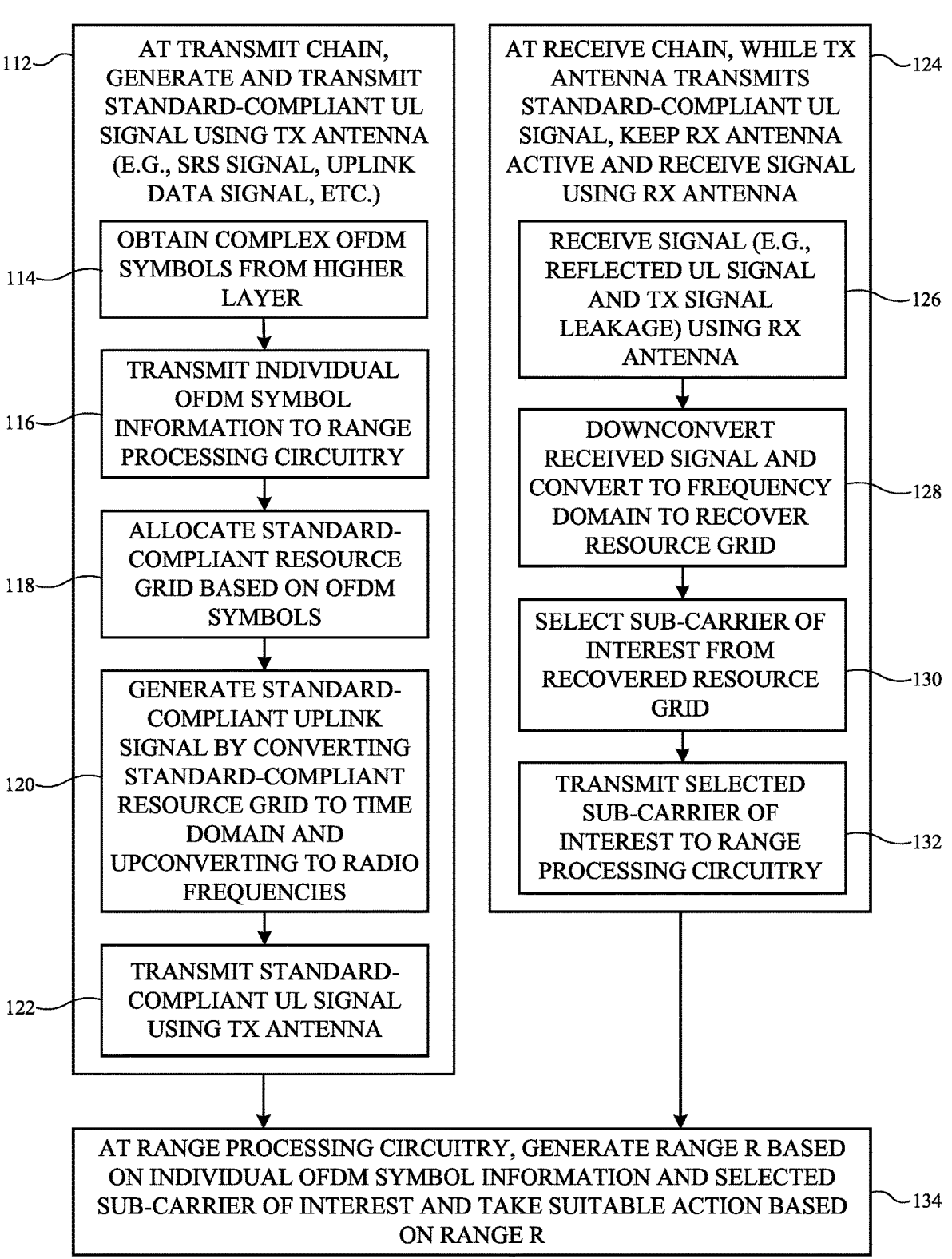

112 — AT TRANSMIT CHAIN, GENERATE AND TRANSMIT STANDARD-COMPLIANT UL SIGNAL USING TX ANTENNA (E.G., SRS SIGNAL, UPLINK DATA SIGNAL, ETC.)

114 — OBTAIN COMPLEX OFDM SYMBOLS FROM HIGHER LAYER

116 — TRANSMIT INDIVIDUAL OFDM SYMBOL INFORMATION TO RANGE PROCESSING CIRCUITRY

118 — ALLOCATE STANDARD-COMPLIANT RESOURCE GRID BASED ON OFDM SYMBOLS

120 — GENERATE STANDARD-COMPLIANT UPLINK SIGNAL BY CONVERTING STANDARD-COMPLIANT RESOURCE GRID TO TIME DOMAIN AND UPCONVERTING TO RADIO FREQUENCIES

122 — TRANSMIT STANDARD-COMPLIANT UL SIGNAL USING TX ANTENNA

124 — AT RECEIVE CHAIN, WHILE TX ANTENNA TRANSMITS STANDARD-COMPLIANT UL SIGNAL, KEEP RX ANTENNA ACTIVE AND RECEIVE SIGNAL USING RX ANTENNA

126 — RECEIVE SIGNAL (E.G., REFLECTED UL SIGNAL AND TX SIGNAL LEAKAGE) USING RX ANTENNA

128 — DOWNCONVERT RECEIVED SIGNAL AND CONVERT TO FREQUENCY DOMAIN TO RECOVER RESOURCE GRID

130 — SELECT SUB-CARRIER OF INTEREST FROM RECOVERED RESOURCE GRID

132 — TRANSMIT SELECTED SUB-CARRIER OF INTEREST TO RANGE PROCESSING CIRCUITRY

134 — AT RANGE PROCESSING CIRCUITRY, GENERATE RANGE R BASED ON INDIVIDUAL OFDM SYMBOL INFORMATION AND SELECTED SUB-CARRIER OF INTEREST AND TAKE SUITABLE ACTION BASED ON RANGE R

*FIG. 4*

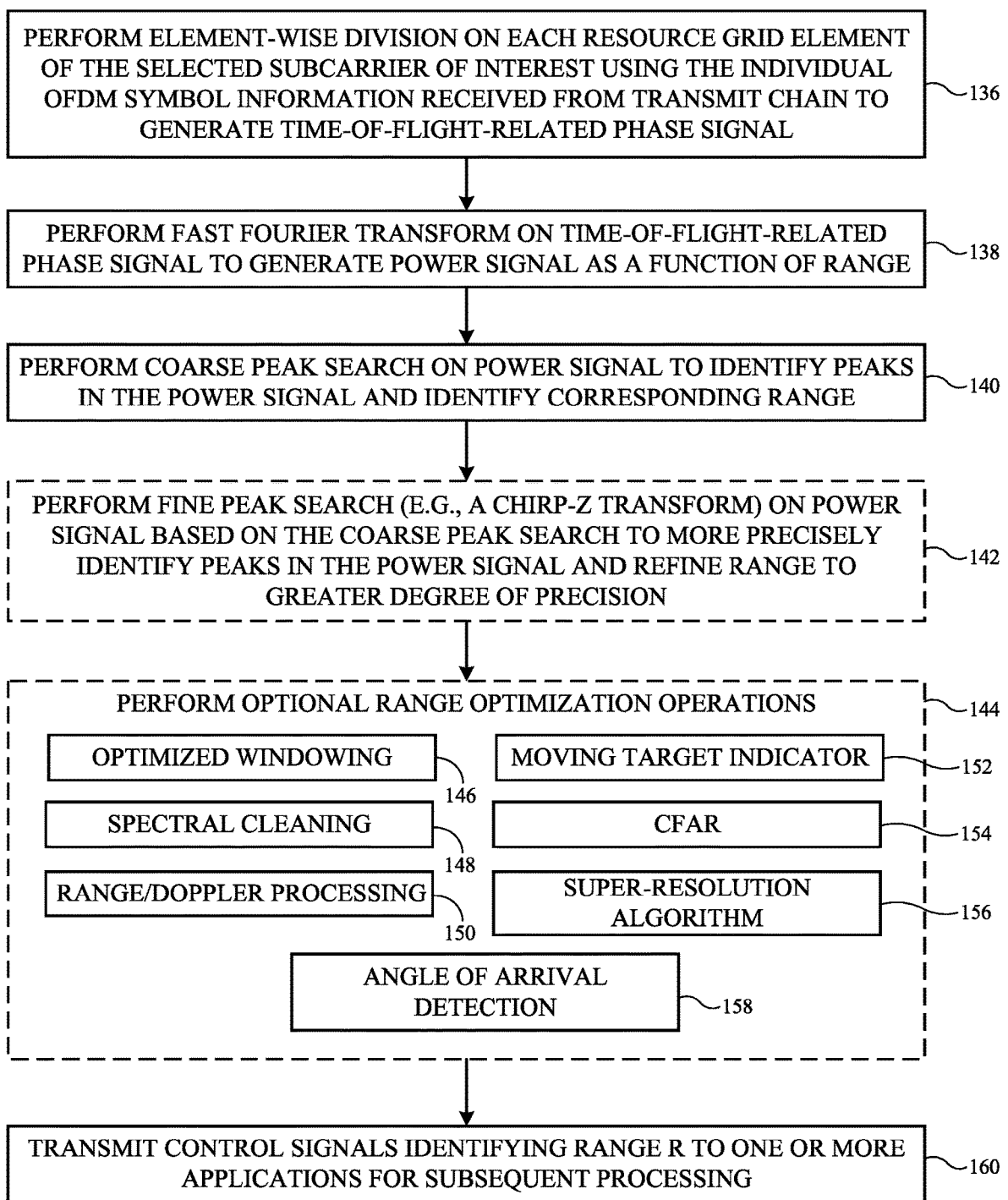

PERFORM ELEMENT-WISE DIVISION ON EACH RESOURCE GRID ELEMENT OF THE SELECTED SUBCARRIER OF INTEREST USING THE INDIVIDUAL OFDM SYMBOL INFORMATION RECEIVED FROM TRANSMIT CHAIN TO GENERATE TIME-OF-FLIGHT-RELATED PHASE SIGNAL ~136

PERFORM FAST FOURIER TRANSFORM ON TIME-OF-FLIGHT-RELATED PHASE SIGNAL TO GENERATE POWER SIGNAL AS A FUNCTION OF RANGE ~138

PERFORM COARSE PEAK SEARCH ON POWER SIGNAL TO IDENTIFY PEAKS IN THE POWER SIGNAL AND IDENTIFY CORRESPONDING RANGE ~140

PERFORM FINE PEAK SEARCH (E.G., A CHIRP-Z TRANSFORM) ON POWER SIGNAL BASED ON THE COARSE PEAK SEARCH TO MORE PRECISELY IDENTIFY PEAKS IN THE POWER SIGNAL AND REFINE RANGE TO GREATER DEGREE OF PRECISION ~142

PERFORM OPTIONAL RANGE OPTIMIZATION OPERATIONS ~144

| OPTIMIZED WINDOWING ~146 | MOVING TARGET INDICATOR ~152 |
| SPECTRAL CLEANING ~148 | CFAR ~154 |
| RANGE/DOPPLER PROCESSING ~150 | SUPER-RESOLUTION ALGORITHM ~156 |
| ANGLE OF ARRIVAL DETECTION ~158 | |

TRANSMIT CONTROL SIGNALS IDENTIFYING RANGE R TO ONE OR MORE APPLICATIONS FOR SUBSEQUENT PROCESSING ~160

*FIG. 5*

ELECTRONIC DEVICES WITH STANDARD-COMPLIANT SENSING CAPABILITIES

This application claims the benefit of U.S. Provisional Patent Application No. 63/323,413, filed Mar. 24, 2022, which is hereby incorporated by reference herein in its entirety.

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals transmitted by the antennas.

In some scenarios, wireless circuitry performs range sensing operations to detect the distance between an external object and the electronic device. If care is not taken, configuring wireless circuitry to perform sensing operations can require excessive hardware real estate on the electronic device and the sensing operations can undesirably interfere with communications.

SUMMARY

An electronic device may include wireless circuitry controlled by one or more processors. The wireless circuitry may include communications circuitry for conveying wireless communications data with a wireless base station according to a wireless communication standard such as a 3GPP 5G NR standard or a 6G standard. The communications circuitry may also perform spatial ranging operations to detect a range between the electronic device and an external object using a standard-compliant transmit waveform defined by and compliant with the communication standard. The standard-compliant transmit waveform may be a Sounding Reference Signal (SRS) waveform, a transmit data waveform, or another waveform.

In performing spatial ranging operations, the communications circuitry may obtain a set of complex OFDM symbols each having respective a phase and magnitude. The communications circuitry may allocate a standard-compliant resource grid based on the set of complex OFDM symbols. The communications circuitry may generate the standard-compliant transmit waveform based on the standard-compliant resource grid. A transmit antenna may transmit the standard-compliant transmit waveform. A receive antenna may receive a reflected version of the standard-compliant transmit waveform that has reflected off the external object. Use of a transmit antenna and a receive antenna is merely illustrative and, in general, the techniques described herein may be performed using one or more antennas.

The communications circuitry may generate a recovered resource grid based on the reflected signal. The communications circuitry may select a sub-carrier of interest from the recovered resource grid and may perform element-wise division on the symbols of the sub-carrier using the corresponding phases and magnitudes of the set of complex OFDM symbols used to generate the standard-compliant transmit waveform. This division may remove the individual phases and amplitudes of the selected sub-carrier to produce a time-of-flight-related signal (e.g., a time-of-flight-related phase signal). The communications circuitry may perform a fast Fourier transform on the time-of-flight-related signal to generate a complex-valued range profile. The communications circuitry may perform a peak detection operation on the complex-valued range profile to detect the range to the external object. By using standard-compliant transmit waveforms to also perform spatial ranging, the communications circuitry can avoid the use of dedicated radar circuitry while also minimizing impact to the transfer of wireless communications data.

An aspect of the disclosure provides an electronic device. The electronic device can include a first antenna. The electronic device can include a second antenna. The electronic device can include one or more processors. The one or more processors can be configured to use one of the first and second antennas to convey wireless communications data with a wireless base station according to a wireless communication standard. The one or more processors can be configured to convey, using one of the first and second antennas, wireless communications data with a wireless base station according to a wireless communication standard, to transmit, using the first antenna, a waveform that is compliant with the wireless communication standard, to receive, using the second antenna, a reflected version of the waveform transmitted by the first antenna, and to detect a range to an external object based at least on the reflected version of the waveform received by the second antenna.

An aspect of the disclosure provides a method of operating a user equipment device. The method can include transmitting, using a first antenna, wireless communications data to a wireless base station using a wireless communication standard. The method can include transmitting, using the first antenna, a standard-compliant waveform based on a set of orthogonal frequency division multiplexing (OFDM) symbols each having a respective phase and magnitude, the standard-compliant waveform being defined by the wireless communication standard. The method can include receiving, using a second antenna, a reflected signal that includes the standard-compliant waveform transmitted by the first antenna. The method can include generating, at one or more processors, a time-of-flight-related signal based on phase and magnitude information of the reflected signal and respective phases and magnitudes of the set of OFDM symbols. The method can include detecting, at the one or more processors, a range between the user equipment device and an external object based on the time-of-flight-related signal.

An aspect of the disclosure provides a method of operating an electronic device. The method can include conveying, using at least one antenna, wireless communications data with a wireless base station in accordance with a wireless communication protocol. The method can include transmitting, using a transmit antenna, a Sounding Reference Signal (SRS) as defined by the wireless communication protocol. The method can include receiving, using a receive antenna, a signal that includes the SRS signal as reflected off an external object. The method can include detecting, at one or more processors, a range between the electronic device and the external object based on the SRS transmitted by the transmit antenna and the signal received by the receive antenna.

BRIEF DESCRIPTION OF THE DRAWINGS

FIG. 3 is a table of illustrative standard-compliant transmit waveforms that may be used by communications circuitry for performing sensing operations and wireless communications in accordance with some embodiments.

FIG. 4 is a flow chart of illustrative operations involved in using communications circuitry to perform sensing operations with standard-compliant transmit waveforms in accordance with some embodiments.

FIG. 5 is a flow chart of illustrative operations involved in generating a range to an external object based on transmitted and reflected standard-compliant transmit waveforms in accordance with some embodiments.

DETAILED DESCRIPTION

Figure 1:
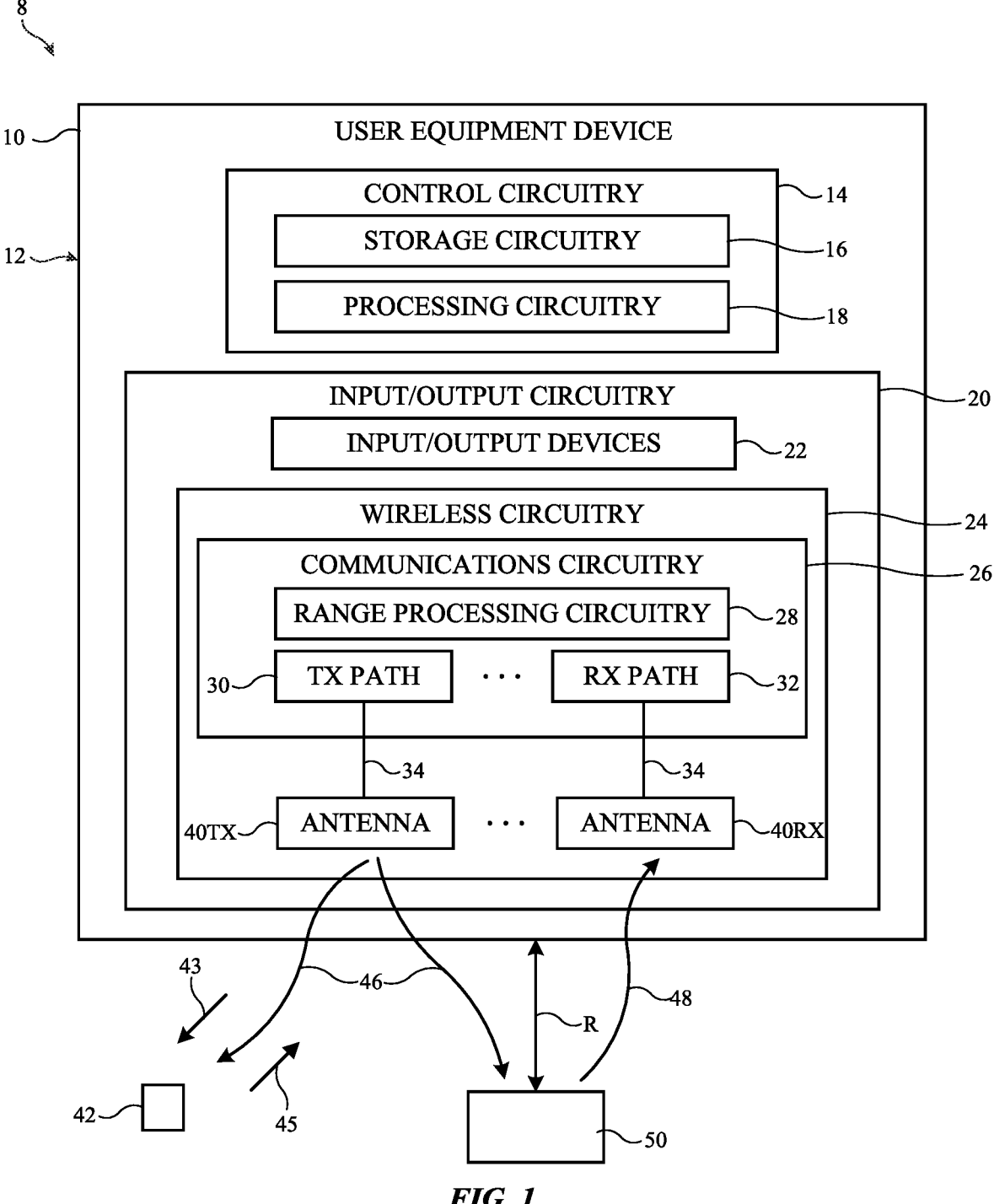
FIG. 1 is a block diagram of an illustrative user equipment device in a communications network having communications circuitry that performs both wireless communications and sensing operations using antennas in accordance with some embodiments.

FIG. 1 is a functional block diagram of an illustrative communications system 8 (sometimes referred to herein as communications network 8) for conveying wireless data between communications terminals. As shown in FIG. 1, communications system 8 may include network nodes (e.g., communications terminals) such as user equipment (UE) device 10 and external communications equipment 42. UE device 10 and external communications equipment 42 may communicate with each other using a wireless communications link. If desired, UE device 10 may wirelessly communicate with external communications equipment 42 without passing communications through any other intervening network nodes in communications system 8 (e.g., UE device 10 may communicate directly with external communications equipment 42 over-the-air).

Communications system 8 may form a part of a larger communications network that includes network nodes coupled to external communications equipment 42 via wired and/or wireless links. The larger communications network may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, wireless base stations (e.g., gNB's), switches, routers, servers, modems, repeaters, telephone lines, network cards, line cards, portals, user equipment (e.g., computing devices, mobile devices, etc.), etc.

The larger communications network may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. UE device 10 may send data to and/or may receive data from other nodes or terminals in the larger communications network via external communications equipment 42 (e.g., external communications equipment 42 may serve as an interface between UE device 10 and the rest of the larger communications network). The communications network may, if desired, be operated by a corresponding network operator or service provider. The portions of communications system 8 other than UE devices such as UE device 10 may sometimes be referred to herein as network equipment of communications network 8. The network equipment may include external communications equipment 42 (e.g., one or more wireless base stations or access points) and/or one or more nodes, terminals, and/or controllers of communications system 8 (e.g., the portion of communications system 8 that does not include user equipment devices). The network equipment may include one or more processors (e.g., controllers) that perform the operations of the network equipment and/or external communications equipment 42 as described herein.

UE device 10 may be a portable electronic device such as a cellular telephone, a portable media player, a wearable electronic device (e.g., a wristwatch, a pendant, googles or other head-mounted devices, etc.), a laptop computer, a tablet computer, a gaming controller, a remote control, an electronic navigation device, other larger electronic devices such as a desktop computer, television, camera device, set-top box, home entertainment system, server, or computer monitor, or may include electronic equipment integrated into a larger system such as a kiosk, building, or vehicle. UE device 10 may therefore sometimes be referred to herein as electronic device 10 or simply as device 10.

External communications equipment 42 may include a wireless base station, access point, relay station, or gateway, may include two or more of these, etc. Implementations in which external communications equipment 42 is a wireless base station (e.g., for conveying cellular telephone signals in one or more cellular telephone bands according to a 4G LTE communication protocol, a 3GPP 5G communication protocol, a 6G protocol, etc.) are described herein as an example. Wireless communications data conveyed between UE device 10 and external communications equipment 42 may include any desired information (e.g., message data, voice data, application data, image data, video data, email data, webpage data, authentication data such as two-factor authentication codes, real-time chat data, cloud services data, sensor data, etc.).

UE device 10 may be provided with an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

As shown in FIG. 1, UE device 10 may include control circuitry 14 and input/output circuitry 20. UE device 10 may include a communications bus and/or other data and control paths (not shown) that couple control circuitry 14 to input/output circuitry 20. Control circuitry 14 may include storage such as storage circuitry 16. Storage circuitry 16 may include volatile memory (e.g., static or dynamic random-access-memory), nonvolatile memory (e.g., flash memory or other electrically-programmable-read-only memory), hard drive storage, etc. Storage circuitry 16 may be integrated within UE device 10 and/or may include removable storage media. Control circuitry 14 may also include processing circuitry 18. Processing circuitry 18 may control the operation of UE device 10. Processing circuitry 18 may include one or more application specific integrated circuits, microprocessors, microcontrollers, baseband processor integrated circuits, graphics processing units, central processing units, digital signal processors, etc.

Control circuitry 14 may be used to run software on UE device 10 such as operating system functions, software applications, satellite navigation applications, internet browsing applications, voice-over-internet-protocol (VOIP) telephone call applications, email applications, media playback applications, operating system functions, etc. To support interactions with external communications equipment 42, control circuitry 14 may be used in implementing communication protocols. Communication protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, etc.), antenna diversity protocols, satellite navigation system protocols (e.g., global positioning system (GPS) protocols, global navigation satellite system (GLONASS) protocols, etc.), antenna-based spatial ranging protocols, or any other desired communication protocols. Each communication protocol may be associated with a corresponding radio access technology (RAT) that specifies the physical connection methodology used in implementing the protocol.

Input/output circuitry 20 may include input/output (I/O) devices 22. Input/output devices 22 are used in providing input to and output from UE device 10 (e.g., to and/or from an end user of UE device 10). For example, input/output devices 22 may include one or more displays such as a touch sensitive display, a force sensitive display, a display that is both touch sensitive and force sensitive, or a display without touch or force sensor capabilities. The display may be a liquid crystal display, light emitting diode display, organic light emitting diode display, etc. Input/output devices 22 may include other components such as sensors (e.g., light sensors, proximity sensors, range sensors, image sensors, audio sensors such as microphones, force sensors, moisture sensors, temperature sensors, humidity sensors, fingerprint sensors, pressure sensors, touch sensors, ultrasonic sensors, accelerometers, gyroscopes, compasses, etc.), status indicator lights, speakers, vibrators, keyboards, touch pads, buttons, joysticks, etc.

Input-output circuitry 20 may include wireless circuitry 24 to support wireless communications and radio-based sensing operations. Wireless circuitry 24 may include two or more antennas 40 such as at least a first antenna 40TX and a second antenna 40RX. Wireless circuitry 24 may also include communications circuitry 26 coupled to antennas 40 over radio-frequency transmission line paths 34. Communications circuitry 26 may include one or more transmit (TX) paths 30 (sometimes referred to herein as TX chains 30 or TX circuitry 30) and may include one or more receive (RX) paths 32 (sometimes referred to herein as RX chains 32 or RX circuitry 32). Communications circuitry 26 may include baseband circuitry (e.g., one or more baseband processors, baseband processor circuitry, or other baseband circuitry) that generates wireless communications data for transmission and/or that processes received wireless communications data. The baseband circuitry may be coupled to and/or may be included within TX path 30 and/or RX path 32.

TX path 30 may include transceiver circuitry (e.g., transmitter circuitry), mixer circuitry (e.g., upconversion circuitry), amplifier circuitry (e.g., power amplifiers), filter circuitry, impedance matching circuitry, switching circuitry, digital-to-analog converter (DAC) circuitry, radio-frequency transmission lines, and/or any other circuitry for transmitting radio-frequency signals using transmit antennas such as transmit antenna 40TX. RX path 32 may include transceiver circuitry (e.g., receiver circuitry), mixer circuitry (e.g., downconversion circuitry), amplifier circuitry (e.g., low-noise amplifiers), filter circuitry, impedance matching circuitry, switching circuitry, analog-to-digital converter (ADC) circuitry, radio-frequency transmission lines, and/or any other circuitry for receiving radio-frequency signals using receive antennas such as receive antenna 40RX.

Antennas 40 may be formed using any desired antenna structures for conveying radio-frequency signals. For example, antennas 40 may include antennas with resonating elements that are formed from loop antenna structures, patch antenna structures, inverted-F antenna structures, slot antenna structures, planar inverted-F antenna structures, helical antenna structures, monopole antennas, dipoles, dielectric resonator antennas, waveguide antennas, hybrids of these designs, etc. Filter circuitry, switching circuitry, impedance matching circuitry, and/or other antenna tuning components may be adjusted to adjust the frequency response and wireless performance of antennas 40 over time. If desired, two or more of antennas 40 may be integrated into an antenna array in combination with any desired methods for digital and/or analog beamforming on the transmit and receive side. The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to free space through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 may include zero, one, or more than one additional antenna used in the transmission and/or reception of radio-frequency signals. In the example of FIG. 1, antennas 40 include at least one transmit (TX) antenna 40TX and at least one receive (RX) antenna 40RX. Transmit antenna 40TX may transmit radio-frequency signals such as radio-frequency signals 46. Receive antenna 40RX may receive radio-frequency signals incident upon UE device 10. Communications circuitry 26 may use transmit antenna 40TX and radio-frequency signals 46 to convey wireless communications data between UE device 10 and external wireless communications equipment 42 (e.g., in uplink direction 43). Wireless circuitry 24 may use receive antenna 40RX to receive radio-frequency signals that include wireless communications data from external communications equipment 42 (e.g., in downlink direction 45), which are not illustrated in FIG. 1 for the sake of clarity. The wireless communications data may be conveyed by communications circuitry 26 bidirectionally or unidirectionally. The wireless communications data may, for example, include data that has been encoded into corresponding data packets/frames such as wireless data associated with a telephone call, streaming media content, internet browsing, wireless data associated with software applications running on UE device 10, email messages, etc.

Communications circuitry 26 may transmit and/or receive radio-frequency signals within corresponding frequency bands at radio frequencies (sometimes referred to herein as communications bands or simply as "bands"). The frequency bands handled by communications circuitry 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, 6G bands such as sub-THz bands at frequencies greater than 100 GHz, etc.), other centimeter or millimeter wave frequency bands between 10-1000 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communication protocols, communications bands under the family of 3GPP wireless communications standards, communications bands under the IEEE 802.XX family of standards, and/or any other desired frequency bands of interest.

Communications circuitry 26 may be coupled to antennas 40 using one or more transmit paths such as TX path 30 and/or one or more receive paths such as RX path 32. TX path 30 may be coupled to transmit antenna 40TX over a first transmission line path 34 and RX path 32 may be coupled to receive antenna 40RX over a second transmission line path 34. Transmission line paths 34 may each include one or more transmission lines (e.g., coaxial cables, microstrip transmission lines, stripline transmission lines, edge-coupled microstrip transmission lines, edge-coupled stripline transmission lines, transmission lines formed from combinations of transmission lines of these types, optical transmission lines such as optical fibers or waveguides, etc.). Transmission lines in UE device 10 may be integrated into rigid and/or flexible printed circuit boards if desired. Communications circuitry 26 may use TX path 30 to transmit radio-frequency signals 46 over transmit antenna 40TX and may use RX path 32 to receive radio-frequency signals using receive antenna 40RX. One or more of the transmission lines may be shared between the transmission line paths 34 coupled to TX path 30 and RX path 32 if desired. The components of wireless circuitry 24 may be formed on one or more common substrates or modules (e.g., rigid printed circuit boards, flexible printed circuit boards, integrated circuits, chips, packages, systems-on-chip, etc.).

The radio-frequency signals 46 transmitted by transmit antenna 40TX in uplink direction 43 may sometimes also be referred to herein as uplink (UL) signals 46 or transmit signals 46. Communication circuitry 26 generates (e.g., modulates, structures, organizes, synthesizes, constructs, forms, etc.) and transmits UL signals 46 according to the RAT and wireless communication standard (sometimes also referred to as a wireless communication protocol, wireless standard, wireless protocol, communication standard, or communication protocol) governing wireless communications between UE devices such as UE device 10 and external communications equipment 42. UL signals 46 may therefore sometimes be referred to herein as standard-complaint signals that comply with and that are specified, organized, and structured based on the corresponding wireless communication standard. The wireless communication standard may be, for example, a 3GPP standard such as a 3GPP 5G NR standard or a 6G standard. The standard is described by a corresponding technical specification issued by the associated standards or regulatory body (e.g., 3GPP) for use in controlling communications under the standard (protocol). The technical specification specifies how signal waveforms such as the transmit waveform of UL signals 46 are to be structured, organized, timed, modulated, and/or transmitted so that external communications equipment 42 is able to properly receive, distinguish, sense, and/or decode the wireless communications data conveyed within UL signals 46 (e.g., for transmission to other parts of network 8). These signal waveforms may be defined herein as (wireless communications) standard-compliant transmit (TX) waveforms, (wireless communications) protocol-compliant transmit (TX) waveforms, or (transmit signal) waveforms that are compliant with the wireless communication standard governing UL signals 46 and wireless communications data transfer between UE device 10 and external communications equipment 42.

In addition to conveying wireless communications data, wireless circuitry 24 may also use antennas 40 to perform radio-frequency sensing operations such as spatial ranging operations (sometimes referred to herein as range sensing operations, ranging operations, or simply as sensing operations). Spatial ranging operations generally involve the transmission of radio-frequency sensing signals using transmit antenna 40TX and the receipt of corresponding reflected sensing signals using receive antenna 40RX. In some scenarios, wireless circuitry 24 includes additional spatial ranging circuitry separate from communications circuitry 26 for transmitting and receiving the radio-frequency sensing signals. For example, wireless circuitry 24 can include dedicated radar circuitry such as frequency modulated continuous wave (FMCW) radar circuitry, orthogonal frequency division multiplexing (OFDM) radar circuitry, frequency modulated stepped wave (FMSCW) radar circuitry, phase coded radar circuitry, or other types of radar circuitry that are separate from communications circuitry 26. Such radar circuitry does not transmit wireless communications data to external communications equipment 42 and does not receive wireless communications data from external communications equipment 42. Instead, the radar circuitry transmits and received dedicated spatial ranging signals that are only used for spatial ranging operations (and not for conveying wireless communications data with external communications equipment 42) such as frequency ramps (e.g., chirp signals), frequency step signals, or other sensing-specific waveforms. These sensing-specific waveforms are generally not compatible with and are not specified, controlled, or organized by the wireless communication standard governing UL signals 46. Such sensing-specific waveforms may therefore sometimes be referred to herein as non-standard-compliant waveforms or signals because the signals do not comply with and are not specified by the technical specification governing communications and wireless communications data transfer between UE device 10 and external communications equipment 42.

Implementing separate spatial ranging circuitry in wireless circuitry 24 and using non-standard-compliant waveforms to perform spatial ranging operations may consume excessive power within UE device 10, may occupy an excessive amount of space (hardware real estate) within UE device 10 that could otherwise be occupied by other components or used to reduce the form factor of UE device 10, can undesirably increase the design complexity and expense of UE device 10, and can undesirably reduce the overall wireless performance of communications circuitry 26 in conveying wireless communications data (e.g., by producing undesirable interference with UL signals 46 and/or by reducing the amount of time that wireless communications data can be conveyed without using UL signals 46 while also accommodating the transmission of sensing-specific waveforms). To mitigate these issues, communications circuitry 26 may use UL signals 46 themselves (e.g., standard-compliant transmit waveforms) to perform spatial ranging operations. Such arrangements may sometimes be referred to as Joint Communication & Sensing (JC&S) arrangements. In some scenarios, wireless base stations such as external communications equipment 42 can perform JC&S under the control of the corresponding network operator or provider. However, it may be desirable for UE device 10 itself to perform JC&S in order to perform a number of different device operations such as body proximity sensing, health monitoring, gesture recognition, light-independent camera auto-focus, etc., while minimizing disruptions to wireless data communications.

To perform spatial ranging operations under a JC&S arrangement, communications circuitry 26 may transmit UL signals 46 (e.g., radio-frequency signals having a standard-compliant waveform) that are used in performing spatial ranging operations. UE device 10 may perform the spatial ranging operations to detect the range R between UE device 10 and an external object such as external object 50. External object 50 may be one or more body parts of a user of UE device 10 or another person or animal, furniture, the floor, ceiling, or walls around UE device 10, a geographic feature, a building, a vehicle, an obstacle or hazard, a peripheral device or another UE device such as a gaming controller, remote control device, wearable device, or headset device, or any other object external to UE device 10 having a reasonably detectable radar cross section.

When performing spatial ranging operations, the transmitted UL signals 46 may reflect off external object 50 and back towards UE device 10, as shown by radio-frequency signals 48. Radio-frequency signals 48 may sometimes be referred to herein as reflected signals 48, which are a reflected version of UL signals 46 that have reflected off external object 50. Receive antenna 40RX may receive reflected signals 48 and may pass the reflected signals up RX path 32. Communications circuitry 26 may include range processing circuitry such as range processing circuitry 28. Range processing circuitry 28 may process the transmitted UL signals 46 and the received reflected signals 48 to detect (e.g., measure, estimate, calculate, compute, identify, generate, produce, etc.) the range R between UE device 10 and external object 50. If desired, range processing circuitry 28 may also process the transmitted and received signals to identify a two or three-dimensional spatial location (position) of external object 50, a velocity of external object 50, and/or an angle of arrival of reflected signals 48. Because range R is detected using standard-compliant waveforms in UL signals 46, range processing circuitry 28 may detect range R using the existing hardware of communications circuitry 26 (e.g., TX path 30 and RX path 32) that are otherwise used to convey wireless communications data with external communications equipment 42 without requiring any additional hardware in wireless circuitry 24.

The example of FIG. 1 is merely illustrative. While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, some or all of the baseband circuitry in wireless circuitry 24 and/or some or all of range processing circuitry 28 may form a part of control circuitry 14. In addition, wireless circuitry 24 may include any desired number of antennas 40. Antennas 40 may include more than one transmit antenna 40TX, more than one receive antenna 40RX (e.g., multiple transmit antennas and/or receive antennas may be used to perform spatial ranging and may, if desired, perform signal beamforming as one or more phased antenna arrays), and zero, one, or more than one other antenna 40. Each antenna 40 may be coupled to communications circuitry 26 by one or more dedicated and/or shared transmission line paths 34. UE device 10 may perform spatial ranging operations using all of the antennas 40 in wireless circuitry 24 or using only a subset of the antennas 40 in wireless circuitry 24. While described herein as a transmit antenna for the sake of simplicity, transmit antenna 40TX may also be used in the reception of radio-frequency signals for communications circuitry 26 if desired (e.g., an additional RX path (not shown) may be coupled transmit antenna 40TX). Similarly, receive antenna 40RX may also be used in the transmission of radio-frequency signals if desired (e.g., an additional TX path (not shown) may be coupled receive antenna 40RX).

Figure 2:
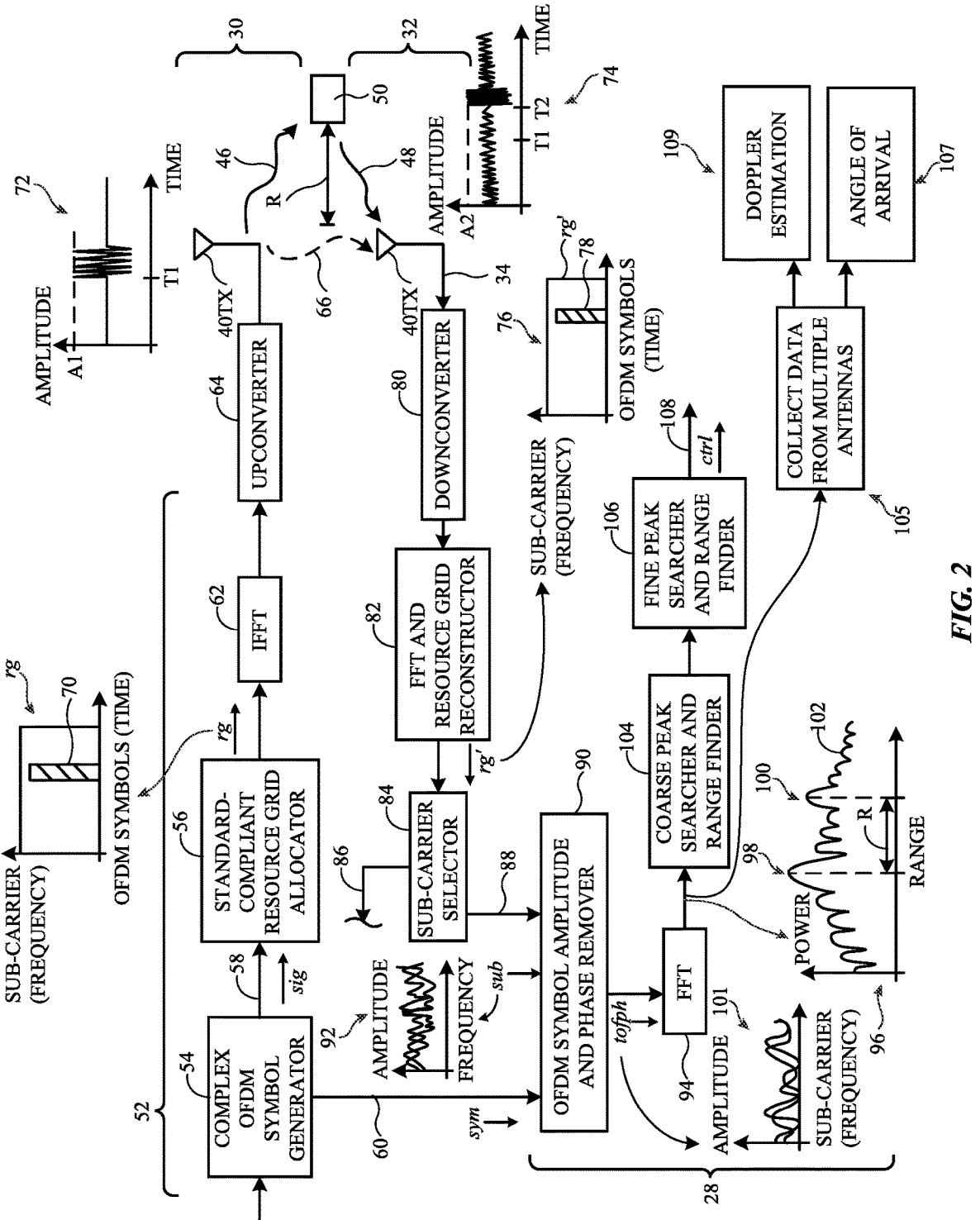
FIG. 2 is a block diagram of illustrative communications circuitry that performs sensing operations using standard-compliant transmit waveforms that are also used for wireless communications in accordance with some embodiments.

FIG. 2 is a circuit schematic diagram showing how communications circuitry 26 may use standard-compliant transmit waveforms in UL signals 46 to detect range R between UE device 10 and external object 50. As shown in FIG. 2, communications circuitry 26 may include TX path 30 coupled to transmit antenna 40TX and RX path 32 coupled to receive antenna 40RX.

TX path 30 may include an OFDM symbol generator such as complex OFDM symbol generator 54, a resource grid generator such as standard-compliant resource grid allocator 56, conversion circuitry such as inverse fast Fourier transform (IFFT) circuitry 62, and upconversion circuitry such as upconverter 64. The output of upconverter 64 may be coupled to transmit antenna 40TX. The input of upconverter 64 may be coupled to the output of IFFT 62. The input of IFFT 62 may be coupled to the output of standard-compliant resource grid allocator 56. The input of standard-compliant resource grid allocator 56 may be coupled to a first output of complex OFDM symbol generator 54 over data path 58. Complex OFDM symbol generator 54 may have a second output coupled to range processing circuitry 28 over control path 60. TX path 30 may include other circuitry (e.g., switching circuitry, filter circuitry, amplifier circuitry, digital-to-analog converter circuitry, additional upconverter circuitry, radio-frequency front end circuitry, impedance matching circuitry, transformer circuitry, clocking circuitry, coupler circuitry, etc.) that is not shown in FIG. 2 for the sake of clarity.

RX path 32 may include downconversion circuitry such downconverter 80, fast Fourier transform (FFT) and resource grid reconstructor 82, and sub-carrier selector 84. The input of downconverter 80 may be coupled to receive antenna 40RX. The output of downconverter 80 may be coupled to the input of FFT and resource grid reconstructor 82. The output of FFT and resource grid reconstructor 82 may be coupled to the input of sub-carrier selector 84. Sub-carrier selector 84 may have a first output 88 coupled to range processing circuitry 28 and, if desired, may have a second output 86 coupled to other circuitry in RX path 32 (e.g., for receiving and processing wireless data in downlink signals received from the external wireless communications equipment). If desired, FFT and resource grid allocator 82 and/or downconverter 80 may have output(s) coupled to second output 86. RX path 32 may include other circuitry (e.g., switching circuitry, filter circuitry, amplifier circuitry, analog-to-digital converter circuitry, additional downconverter circuitry, radio-frequency front end circuitry, impedance matching circuitry, transformer circuitry, clocking circuitry, coupler circuitry, etc.) that has been omitted from FIG. 2 for the sake of clarity.

Range processing circuitry 28 may include OFDM symbol amplitude and phase remover circuitry 90, FFT 94, and peak searching circuitry such as coarse peak searcher and range finder 104 and optionally fine peak searcher and range finder 106. OFDM symbol amplitude and phase remover 90 may have a first input coupled to complex OFDM symbol generator 54 over control path 60 and may have a second input coupled to first output 88 of sub-carrier selector 84. The output of OFDM symbol amplitude and phase remover 90 may be coupled to the input of FFT 94. The output of FFT 94 may be coupled to coarse peak searcher and range finder 104. The output of coarse peak searcher and range finder 104 may be coupled to the input of fine peak searcher and range finder 106. Fine peak searcher and range finder 106 may have an output 108 (e.g., the output of range processing circuitry 28).

Complex OFDM symbol generator 54, standard-compliant resource grid allocator 56, IFFT 62, sub-carrier selector 84, FFT resource grid reconstructor 82, and range processing circuitry 28 may, for example, be implemented in digital logic 52 of communications circuitry 26 and may be implemented in software (e.g., running on storage circuitry and executed by one or more processors) and/or in hardware (e.g., using one or more logic gates, adders, subtractors, multipliers, dividers, other circuit components, diodes, transistors, switches, arithmetic logic units (ALUs), registers, application-specific integrated circuits, field-programable gate arrays, one or more processors, look-up tables, etc.). Some or all of these components may form part of control circuitry 14 of FIG. 1 and the operations of some or all of these components may be performed by one or more processors on UE device 10, for example.

When conveying wireless communications data, the components of TX path 30 may generate UL signals 46 that convey the wireless communications data (e.g., as a series of data packets modulated onto baseband signals that are upconverted to radio frequencies) and transmit antenna 40TX may transmit UL signals 46 to external communications equipment 42 of FIG. 1. The UL signals conveying the wireless communications data include standard-compliant waveforms that are organized and generated in accordance with the wireless communication standard governing communications between UE device 10 and the external communications equipment. Similarly, the components of RX path 32 may receive downlink signals that convey wireless communications data from the wireless communications equipment. The downlink signals that convey the wireless communications data include standard-compliant waveforms that are organized and generated (and received and decoded) in accordance with the wireless communication standard governing communications between UE device 10 and the external communications equipment.

When performing spatial ranging operations, TX path 30, transmit antenna 40TX, RX path 32, and receive antenna 40RX are concurrently active. TX path 30 may generate and transmit standard-compliant waveforms (e.g., uplink signals 46) that are used for performing spatial ranging. To produce the standard-compliant waveforms, complex OFDM symbol generator 54 (sometimes referred to herein as complex OFDM symbol generation circuitry 54, complex OFDM symbol generation engine 54, or complex OFDM symbol generation block 54) may obtain (e.g., receive or generate) a set of complex OFDM symbols sig from a higher layer for inclusion in UL signals 46. Complex OFDM symbol generator 54 may transmit the set of complex OFDM symbols sig to standard-compliant resource grid allocator 56 over data path 58. Complex OFDM symbol generator 54 may also transmit individual OFDM symbol information sym to OFDM symbol amplitude and phase remover 90 via control path 60. Individual OFDM symbol information sym may include respective amplitude and phase information associated with each of the complex OFDM symbols in the set of complex OFDM symbols sig. For example, each of the symbols in the set of complex OFDM symbols sig may be represented by a corresponding complex number in a sequence of complex numbers, and individual OFDM symbol information sym may identify each of these complex numbers. OFDM symbol amplitude and phase remover 90 may use individual OFDM symbol information sym to remove the known phase and amplitude of each corresponding complex OFDM symbol that is received over RX path 32 (described further below). The set of complex OFDM symbols sig may also be represented by in-phase and quadrature-phase (I/Q) curves of amplitude as a function of sub-carrier (frequency).

Standard-compliant resource grid allocator 56 (sometimes referred to herein as standard-compliant resource grid allocation circuitry 56, standard-compliant resource grid allocation engine 56, or standard-compliant resource grid allocation block 56) may allocate (e.g., generate, compute, calculate, assign, populate, compute, etc.) a resource grid rg based on the set of complex OFDM symbols sig received from complex OFDM symbol generator 54. Plot 68 of FIG. 2 illustrates one exemplary resource grid rg that may be generated based on the set of complex OFDM symbols sig received from complex OFDM symbol generator 54. As shown by plot 68, resource grid rg may include a set of allotted resources (e.g., resource elements or blocks) 70 in units of time (e.g., as partitioned into OFDM symbols) and frequency (e.g., as partitioned into sub-carriers) that correspond to the set of complex OFDM symbols sig received from complex OFDM symbol generator 54. Resource grid rg may be organized and structured according to the wireless communication standard governing UL signals 46 and is therefore sometimes referred to herein as standard-compliant resource grid rg (e.g., resource grids that are organized and structured according to the wireless communication standard governing UL signals 46 may be defined herein as standard-compliant resource grids). In general, different standards may specify different resource grid allocations and/or structures. Standard-compliant resource grid allocator 56 may transmit standard-compliant resource grid rg to IFFT 62.

IFFT 62 may perform an IFFT operation and parallel-to-serial conversion on standard-compliant resource grid rg and may add a cyclic prefix (e.g., as required by the communication standard) to produce the standard-compliant transmit waveform (e.g., an OFDM waveform) that is then passed to upconverter 64. Upconverter 64 may up-convert the standard-compliant transmit waveform to radio frequencies as UL signals 46. Transmit antenna 40TX may then transmit UL signals 46 (and thus the standard-compliant transmit waveform) for use in performing spatial ranging operations. Plot 72 of FIG. 2 shows one example of the standard-compliant transmit waveform that may be transmitted in UL signals 46 by upconverter 64 and transmit antenna 40TX (in amplitude as a function of time). As shown by plot 72, the standard-compliant transmit waveform may include a signal burst beginning at time T1 and having a peak amplitude A1, for example. This time-domain signal burst may correspond to where the allocated subcarriers are in standard-compliant resource grid rg (e.g., as shown by allotted resources 70 in plot 68).

In one example, the standard-compliant transmit waveform may include a sounding reference signal (SRS) waveform (e.g., the UL signals 46 used in performing spatial ranging operations may be SRS signals). SRS waveforms are particularly useful for performing spatial ranging operations because in many communication standards (e.g., a 3GPP 5G standard), SRS signals are regularly and continuously sent out at frequent and predictable intervals to allow nearby wireless base stations to estimate the UE device's UL channel quality. During normal wireless data communications operations (e.g., without performing spatial ranging operations), RX path 32 and receive antenna 40RX are inactive while TX path 30 and transmit antenna 30TX transmit SRS signals in UL signals 46 according to the wireless communication standard governing communications between UE device 10 and the wireless base station. However, when communications circuitry 26 is using SRS signals in UL signals 46 to perform spatial ranging operations, RX path 32 and receive antenna 40RX remain active while TX path 30 and transmit antenna 30TX transmit SRS signals. In another example, the standard-compliant transmit waveform used for spatial ranging operations may include the wireless communications data waveforms themselves (e.g., wireless data packets that convey message data, application data, web browser data, email data, video data, audio data, etc.) transmitted over a physical uplink shared channel (PUSCH) or another channel. As such, the UL signals 46 that are used to perform spatial ranging operations may concurrently be used for the transfer of wireless communications data and/or other standard-specified control, reference, channel quality assessment, or signaling functions, thereby minimizing the impact of spatial ranging operations on wireless data communications.

In the example where the standard-compliant transmit waveform used for spatial ranging with UL signals 46 is an SRS waveform, a higher layer (or complex OFDM symbol generator 54) may define the corresponding subcarrier spacing (e.g., 120 kHz), define the number of resource blocks (e.g., 275 for a 400 MHz bandwidth), and define a carrier with default properties to modify carrier properties of interest, for example. A higher layer (or complex OFDM symbol generator 54) may also define an SRS with default properties, define a number of OFDM symbols (e.g., length of the signal in time), define a number of elements (e.g., signal bandwidth), and define position within a radio frame slot grid to modify the SRS properties of interest (also with respect to carrier properties). Standard-compliant resource grid allocator 56 may use the modified carrier properties of interest and modified SRS properties of interest to create a radio frame slot grid of standard-compliant resource grid rg according to the carrier definition and allocated according to the SRS definition (e.g., as shown by plot 68). IFFT 62 and/or other circuitry in TX path 30 may generate the standard-compliant (e.g., OFDM) transmit waveform for UL signals 46 by performing an IFFT operation and parallel-to-serial conversion on the standard-compliant resource grid rg and by adding a cyclic prefix.

The transmitted UL signals may reflect off external object 50 located at range (distance) R from the UE device as reflected signals 48. Receive antenna 40RX may receive reflected signals 48. At the same time, receive antenna 40RX may also receive some of the UL signals 46 transmitted by TX path 30 and transmit antenna 40TX that have not reflected off external object 50 (as TX/RX leakage 66). TX/RX leakage 66 may include over-the-air leakage and/or conducted leakage. Downconverter 80 in RX path 32 may receive a signal that includes the combination of reflected signals 48, TX/RX leakage 66, and any other signals incident at receive antenna 40RX.

Plot 74 of FIG. 2 shows one example of the signal (RX waveform) that may be received at downconverter 80 (in amplitude as a function of time). As shown by plot 74, the received signal may include a signal burst beginning at time T2 and having a peak amplitude A2, for example. The signal burst may be delayed by time (T2-T1) relative to time T1 associated with the time-of-flight of UL signals 46 towards and off of external object 50. Peak amplitude A2 may be lower than peak amplitude A1 due to free space path loss and the radar cross section of external object 50. The received signal may also be much noisier than the UL signals 46 transmitted by transmit antenna 40TX. In other words, the signal at downconverter 80 may include a delayed and attenuated version of the transmitted standard-compliant waveform in UL signals 46, which may be compared with the transmitted standard-compliant waveform in UL signals 46 for identifying range R.

Downconverter 80 may downconvert the received signal from radio frequencies (e.g., to baseband) and may pass the downconverted signal to FFT and resource grid reconstructor 82. FFT and resource grid reconstructor 82 may shift the RX waveform received from downconverter 80 to synchronize the signal samples in the RX waveform with the corresponding signal samples in the standard-compliant transmit signal waveform transmitted by TX path 30 (e.g., using a matched filter). FFT and resource grid reconstructor 82 may then recover (reconstruct) the standard-compliant resource grid rg produced by TX path 30 from the RX waveform received by RX path 32, as recovered (reconstructed) standard-compliant resource grid rg'. This may, for example, involve removing the cyclic prefix from the RX waveform, performing serial-to-parallel conversion, and performing an FFT operation on the RX waveform.

Plot 76 of FIG. 2 illustrates one exemplary recovered (reconstructed) resource grid rg' that may be generated based on the RX waveform received by RX path 32. As shown by plot 76, recovered resource grid rg' may include a set of allotted resources (e.g., resource elements or blocks) 78 in units of time (e.g., as partitioned into OFDM symbols) and frequency (e.g., as partitioned into sub-carriers) that correspond to allotted resources 70 in standard-compliant resource grid rg and thus the set of complex OFDM symbols sig provided by complex OFDM symbol generator 54. FFT and resource grid reconstructor 82 may transmit recovered resource grid rg' to sub-carrier selector 84.

Sub-carrier selector 84 may select a sub-carrier (frequency) of interest from recovered resource grid rg' and may provide a corresponding signal sub to OFDM symbol amplitude and phase remover 90 via output 88. The signal sub may include the elements of recovered resource grid rg' (e.g., the resource grid elements) from the selected sub-carrier of interest. If desired, sub-carrier selector 84 may provide signal sub, recovered resource grid rg', or the RX waveform itself to other circuitry in RX path 32 via output 86 for other processing (e.g., sub-carrier selector 84 may be bypassed when communications circuitry 26 does not perform spatial ranging operations if desired).

OFDM symbol amplitude and phase remover 90 may use the individual OFDM symbol information sym received from complex OFDM symbol generator 54 in TX path 30 to perform element-wise division for (on) each resource grid element of the selected sub-carrier of interest in the signal sub received from sub-carrier selector 84 (e.g., removing the code from the coded RX waveform, where each code is specified for each resource element in signal sub by the portion of individual OFDM symbol information sym corresponding to that resource element). This may remove (e.g., subtract, filter, or divide) the corresponding amplitude and phase information from each OFDM symbol in signal sub, producing (e.g., recovering, generating, identifying, or leaving) time-of-flight-related signal tofph (e.g., a time-of-flight-related phase signal). Plot 101 of FIG. 2 shows one example of the time-of-flight-related signal tofph that may be produced by OFDM symbol amplitude and phase remover 90 (e.g., as I/Q signal curves in amplitude as a function of sub-carrier (frequency). Because amplitude and phase information from the original complex OFDM symbols from the transmitted waveform have been removed by this point, the phase information in time-of-flight-related signal tofph is purely indicative of the time-of-flight of UL signals 46 and reflected signals 48. Given the known speed of UL signals 46 and reflected signals 48, range processing circuitry 28 can therefore recover range R from time-of-flight-related signal tofph.

FFT 94 may perform an FFT operation on time-of-flight-related signal tofph to generate (e.g., calculate, compute, recover) a complex-valued range profile as a function of range (e.g., a power signal), as illustrated by curve 102 in plot 96 of FIG. 2. The example of FIG. 2 in which FFT 94 performs an FFT operation is merely illustrative and, in general, FFT 94 may perform any desired correlation-receive equivalent matched filter operation (e.g., FFT 94 may be replaced with a correlation-receive equivalent matched filter that performs any desired correlation-receive equivalent matched filter operation such as an FFT operation, in one example). As shown by curve 102, there will be peaks in power as a function of range in the received signal (after division to remove OFDM symbol amplitude and phase). Coarse peak searcher and range finder 104 may perform coarse peak detection on the complex-valued range profile to detect peaks such as peaks 98 and 100 of plot 96. Peak 98 may, for example, be produced by the TX/RX leakage 66 at receive antenna 40RX upon transmission of UL signals 46 by transmit antenna 40TX. Peak 100 may be produced by reflected signals 48 upon receipt by receive antenna 40RX. Coarse peak searcher and range finder 104 may identify (e.g., compute, estimate, measure, calculate, generate, determine, or detect) range R based on the distance between peaks 98 and 100 along the X-axis of plot 96 (e.g., range R corresponds to the separation of peaks 98 and 100 by a constant factor). If desired, range processing circuitry 28 may also include fine peak searcher and range finder 106 that performs a finer (more precise) peak and range detection on the complex-valued range profile. Fine peak searcher and range finder 106 may be omitted if desired.

Range processing circuitry 28 may output control signal ctrl that identifies the range R detected between the UE device and external object 50 using the standard compliant transmit waveform in UL signals 46. One or more other applications may use the range R identified by control signal ctrl to perform any desired operations. For example, control circuitry 14 may use range R to detect the presence of a body part or person at or near one or more antennas 40 (e.g., body proximity sensing) and may use this information to switch active antennas and/or to reduce transmit power levels to ensure that the UE device continues to satisfy regulations on radio-frequency emission and/or absorption. As another example, control circuitry 14 may use range R to detect one or more user input gestures or other control inputs to the UE device (e.g., by tracking how range R changes over time and/or by identifying the distance between external object 50 and multiple antennas in the UE device). As another example, control circuitry 14 may use range R to perform health monitoring (e.g., to monitor one or more vital statistics of the user of the UE device or another person, to detect if the user has fallen, was in an accident, has become injured, etc.). As yet another example, control circuitry 14 may use range R to perform light-independent camera autofocus operations. For example, range R may be used to identify a focal length for the lens(es) of one or more cameras on the UE device regardless of ambient lighting conditions, and control circuitry 14 may adjust the lens(es) to exhibit the identified focal length so clear images can be captured of external object 50. These examples are merely illustrative and, in general, range R may be used for any desired purpose. If desired, range processing circuitry 28 may include one or more processing paths coupled to the output of FFT 94 in parallel to peak searcher and range finders 104 and 106 for performing other processing operations. As an example, range processing circuitry 28 may a second processing path having block 105 that collects data (e.g., signals tofph) from multiple antennas and having a block 107 that detects the angle-of-arrival of reflected signals 48 based on this data. Additionally or alternatively, range processing circuitry 28 may include a processing path having block 109 that performs Doppler estimation on the signal associated with curve 102.

In general, TX path 30 may generate any desired standard-compliant transmit waveform for UL signals 46 to be used in detecting range R. FIG. 3 includes a table 110 showing some standard-compliant transmit waveforms that may be used by communications circuitry 26 to detect range R. As shown by table 110, the standard-compliant transmit waveform may be a standard-compliant reference signal waveform such as an SRS waveform (e.g., UL signals 46 used in measuring range R may be SRS signals). The standard-compliant transmit waveform may also be a standard-compliant transmit data waveform TX_DATA used to convey wireless communications data (e.g., data packets) to external communications equipment 42 (e.g., UL signals 46 may be UL data signals). The transmit data waveform TX_DATA may be transmitted over a PUSCH channel, as one example. The standard-compliant transmit waveform may include other standard-compliant reference signal waveforms such as a demodulation reference signal (DMRS) waveform (e.g., a PUSCH DMRS waveform), a phase tracking reference signal (PTRS) waveform (e.g., a PUSCH PTRS waveform), and/or a channel state information reference signal (CSI-RS) waveform. These examples are merely illustrative and, in general, the standard-compliant reference signal waveform may be any standard-compliant waveform specified by the wireless communication protocol governing UL signals 46 and communications between UE device 10 and external communications equipment 42 (e.g., a 3GPP 5G NR specified waveform, a 6G specified waveform, a 4G LTE waveform, etc.).

FIG. 4 is a flow chart of illustrative operations involved in using communications circuitry 26 of FIGS. 1 and 2 to perform spatial ranging operations using the standard-compliant transmit waveform. Operations 112 and 124 may be performed concurrently (e.g., simultaneously) while TX path 30 and RX path 32 in communications circuitry 26 are concurrently active. Operation 112 may include operations 114-122. Operation 124 may include operations 126-132.

At operation 112, TX path 30 may generate a standard-compliant transmit waveform and may transmit the standard-compliant transmit waveform in UL signals 46 using transmit antenna 40TX. For example, at operation 114 complex OFDM signal generator 54 may obtain the set of complex OFDM symbols sig from a higher layer for transmission within the standard-compliant transmit waveform (e.g., a set of OFDM symbols corresponding to one of the waveforms shown in table 110 of FIG. 3). Complex OFDM signal generator 54 may transmit the set of complex OFDM symbols sig to standard-compliant resource grid allocator 56.

At operation 116, complex OFDM symbol generator 54 may transmit the individual OFDM symbol information sym (e.g., respective OFDM symbol phase and amplitude information for each complex OFDM symbol in the set of complex OFDM symbols sig) to OFDM symbol amplitude and phase remover 90 of range processing circuitry 28.

At operation 118, standard-compliant resource grid allocator 56 may generate (allocate) standard-compliant resource grid rg based on the set of complex OFDM symbols sig.

At operation 120, IFFT 62, upconverter 64, and other circuitry in TX path 30 may generate UL signals 46 that include the standard-compliant transmit waveform specified by standard-compliant resource grid rg. For example, IFFT 62 may perform an IFFT operation and parallel-to-serial conversion on standard-compliant resource grid rg and may add a cyclic prefix (e.g., as required by the wireless communication standard) to produce the standard-compliant transmit waveform (e.g., an OFDM waveform) that is then passed to upconverter 64. Upconverter 64 may up-convert the standard-compliant transmit waveform to radio frequencies as UL signals 46.

At operation 122, transmit antenna 40TX may transmit UL signals 46 (and thus the standard-compliant transmit waveform) for use in performing spatial ranging operations (e.g., as SRS signals, transmit data signals, DMRS signals, PTRS signals, CSI-RS signals, etc.).

Meanwhile, at operation 124, RX path 32 and receive antenna 40RX may remain active while TX path 30 and transmit antenna 40TX transmit UL signals 46 having the standard-compliant transmit waveform (e.g., as transmitted while processing operation 112). Receive antenna 40RX and RX path 32 may receive a signal while active. For example, at operation 126, receive antenna 40RX and RX path 32 may receive a signal that includes reflected signals 48 (e.g., the UL signals 46 having the standard-compliant transmit waveform after reflection off external object 50) and TX/RX leakage 66.

At operation 128, downconverter 80 may downconvert the received signal from radio frequencies. FFT and resource grid reconstructor 82 may shift the RX waveform received from downconverter 80 to synchronize the signal samples in the RX waveform with the corresponding signal samples in the standard-compliant transmit signal waveform transmitted by TX path 30 (e.g., using a matched filter). FFT and resource grid reconstructor 82 may then recover (reconstruct) the standard-compliant resource grid rg produced by TX path 30 from the RX waveform received by RX path 32, as recovered (reconstructed) standard-compliant resource grid rg'. This may, for example, involve removing the cyclic prefix from the RX waveform, performing serial-to-parallel conversion, and performing an FFT operation on the RX waveform.

At operation 130, sub-carrier selector 84 may select a sub-carrier of interest from recovered standard-compliant resource grid rg'.

At operation 132, sub-carrier selector 84 may provide signal sub to OFDM symbol amplitude and phase remover 90 via output 88. The signal sub may include the elements of recovered resource grid rg' (e.g., the resource grid elements) from the selected sub-carrier of interest. Processing may loop back from operation 132 to operation 130 to sweep through different sub-carriers of interest if desired. Processing may proceed from operations 122 and 132 to operation 134.

At operation 134, range processing circuitry 28 may generate (e.g., detect, measure, identify, compute, calculate, estimate, produce, etc.) range R (e.g., control signal ctrl) based on the individual OFDM symbol information sym produced at operation 116 and based on the selected sub-carrier of interest (e.g., signal sub produced at operation 132). UE device 10 may then take any desired action based on range R. For example, control circuitry 14 may perform body proximity sensing, gesture detection, health monitoring, light-independent camera autofocus operations, and/or any other desired operations based on range R.

FIG. 5 is a flow chart of illustrative operations that may be performed by range processing circuitry 28 to generate range R based on individual OFDM symbol information sym and signal sub. The operations of FIG. 5 may, for example, be performed while processing operation 134 of FIG. 4.

At operation 136, OFDM symbol amplitude and phase remover 90 may perform element-wise division on each resource grid element of the selected sub-carrier of interest (e.g., signal sub) using the individual OFDM symbol information sym. This may remove the corresponding amplitude and phase information from each OFDM symbol in the selected sub-carrier of interest (signal sub), producing time-of-flight-related signal tofph. Because amplitude and phase information from the original complex OFDM symbols from the transmitted waveform have been removed by this point, the phase information in time-of-flight-related signal tofph is purely indicative of the time-of-flight of UL signals 46 and reflected signals 48.

At operation 138, FFT 94 may perform an FFT operation on time-of-flight-related signal tofph to generate a complex-valued range profile (e.g., the signal shown by curve 102 of FIG. 2 plotting the signal in power as a function of range). The complex-valued range profile may also cover angle-of-arrival and Doppler-related sensing, for example.

At operation 140, coarse peak searcher and range finder 104 may perform a coarse peak search on the complex-valued range profile (e.g., power signal) to detect peaks such as peaks 98 and 100 of plot 96 in FIG. 2. Coarse peak searcher and range finder 104 may identify range R based on the distance between two of the detected peaks.

At optional operation 142, fine peak searcher and range finder 106 may perform a fine (precise) search on the complex-valued range profile (e.g., power signal) to detect the peaks and thus range R. For example, fine peak searcher and range finer 106 may perform a chirp-z transform over a range of frequencies as specified by coarse peak searcher and range finder 104. Operation 142 may be omitted if desired.

At optional operation 144, range processing circuitry 28 may perform additional range optimization operations on the generated range R to further refine, optimize, and/or process range R to produce additional information about external object 50 and/or the received reflected signals. For example, range processing circuitry 28 may perform optimized windowing (sometimes referred to herein as a window optimization) on the received signal (operation 146), may generate a moving target indicator to filter out or remove non-moving targets from the signal (operation 152), may perform spectral cleaning on the signal (operation 148), may perform range/Doppler processing on the signal using block 109 of FIG. 2 (operation 150), may perform a super-resolution algorithm to more precisely resolve the location of the external object (operation 156), may perform constant false alarm rate (CFAR) detection on the signal (operation 154), and/or may perform angle-of-arrival (AoA) detection using the signal to detect the angle at which reflected signals 48 are received at the UE device at operation 158 (e.g., using at least two ranges R as detected using at least two respective antennas on the UE device, as processed by blocks 105 and 107 of FIG. 2). Operation 144 may be omitted if desired.

At operation 160, range processing circuitry 28 may transmit control signals ctrl identifying range R at output 108 to one or more applications running on control circuitry 16 for further processing. In this way, communications circuitry 26 may use standard-compliant waveforms for also performing spatial ranging operations without requiring separate spatial ranging hardware on UE device 10 and with minimal impact to wireless data communications.

UE device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-5 (e.g., the operations of FIGS. 4 and 5) may be performed by the components of UE device 10 using software, firmware, and/or hardware (e.g., dedicated circuitry or hardware). Software code for performing these operations may be stored on non-transitory computer readable storage media (e.g., tangible computer readable storage media) stored on one or more of the components of UE device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of UE device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. Wireless circuitry comprising:

a first antenna;

a second antenna; and one or more processors communicatively coupled to the first antenna and the second antenna and configured to convey, using one of the first and second antennas, wireless communications data with a wireless base station according to a wireless communication standard, transmit, using the first antenna, a waveform that is compliant with the wireless communication standard, wherein the waveform carries a set of orthogonal frequency division multiplexing (OFDM) symbols receive, using the second antenna, a reflected version of the waveform transmitted by the first antenna, generate a time-of-flight related signal by performing element-wise removal, of phase and amplitude information associated with the OFDM symbols, from a resource grid associated with the reflected version of the waveform received by the second antenna, and detect a range to an external object based at least on the time-of-flight related signal.

2. The wireless circuitry of claim 1, wherein the one or more processors is configured further to:

generate the set of OFDM symbols associated with the waveform transmitted by the first antenna;

allocate an additional resource grid that is compliant with the wireless communication standard based on the set of OFDM symbols; and convert the additional allocated resource grid into the waveform transmitted by the first antenna.

3. The wireless circuitry of claim 2, wherein the one or more processors is further configured to:

generate the resource grid based on the reflected version of the waveform received by the second antenna.

4. The device wireless circuitry of claim 3, wherein the one or more processors is further configured to:

select a sub-carrier from the resource grid; and generate the time-of-flight-related signal by performing the element-wise removal of the amplitude and phase information from the selected sub-carrier of the resource grid.

5. The wireless circuitry of claim 4, wherein the one or more processors is further configured to:

generate a complex-valued range profile by performing a correlation-receive equivalent matched filter operation on the time-of-flight-related signal;

perform a peak detection on the complex-valued range profile; and detect the range based on the peak detection.

6. The wireless circuitry of claim 5, wherein the peak detection operation comprises a coarse peak detection followed by a fine peak detection.

7. The wireless circuitry of claim 5, wherein the waveform comprises a Sounding Reference Signal (SRS) waveform or a transmit data waveform defined by the communication standard.

8. The wireless circuitry of claim 1, wherein the communication standard comprises a 3GPP 5G communication standard.

9. The wireless circuitry of claim 1, wherein the waveform comprises a Sounding Reference Signal (SRS) waveform defined by the communication standard or a transmit data waveform defined by the communication standard.

10. A method of operating a user equipment device comprising:

transmitting, using a first antenna, wireless communications data to a wireless base station using a wireless communication standard;

transmitting, using the first antenna, a standard-compliant waveform based on a set of orthogonal frequency division multiplexing (OFDM) symbols each having a respective phase and magnitude, the standard-compliant waveform being defined by the wireless communication standard;

receiving, at a second antenna, a reflected signal that includes the standard-compliant waveform transmitted by the first antenna;

generating, at one or more processors, a time-of-flight-related signal based on phase and magnitude information of the reflected signal and respective phases and magnitudes of the set of OFDM symbols; and detecting, at the one or more processors, a range between the user equipment device and an external object based on the time-of-flight-related signal.

11. The method of claim 10, wherein detecting the range between the user equipment device and the external object comprises:

performing a correlation-receive equivalent matched filter operation on the time-of-flight-related signal to generate a complex-valued range profile.

12. The method of claim 11, wherein detecting the range between the user equipment device and the external object further comprising:

detecting a first peak in the complex-valued range profile;

detecting a second peak in the complex-valued range profile; and detecting the range based on a separation between the first peak and the second peak.

13. The method of claim 10, wherein generating the standard-compliant waveform comprises:

allocating a resource grid based on the set of OFDM symbols;

performing parallel-to-serial conversion and an inverse fast Fourier transform on the allocated resource grid to generate a signal;

adding a cyclic prefix to the signal; and upconverting the signal to a radio frequency.

14. The method of claim 13, further comprising:

recovering the resource grid based on the reflected signal received with the second antenna;

selecting a sub-carrier from the recovered resource grid; and generating the time-of-flight-related signal by performing element-wise division on OFDM symbols in the selected sub-carrier based on the respective phases and magnitudes of the set of OFDM symbols, wherein recovering the resource grid comprises:

time-synchronizing the reflected signal to the standard-compliant waveform transmitted by the first antenna;

downconverting the reflected signal from the radio frequency;

removing the cyclic prefix from the reflected signal; and performing serial-to-parallel conversion and a fast Fourier transform on the reflected signal.

15. The method of claim 10, wherein the standard-compliant waveform comprises a Sounding Reference Signal (SRS) waveform.

16. The method of claim 10, wherein the second antenna is integrated into a phased antenna array and the method further comprises:

with the one or more processors, detecting an angle-of-arrival of the reflected signal based on the reflected signal as received by the second antenna and as received by a third antenna in the phased antenna array.

17. The method of claim 10, further comprising:

with the one or more processors, generating a moving target indicator based on the time-of-flight-related signal.

18. The method of claim 10, further comprising:

with the one or more processors, performing, based on the time-of-flight-related signal, constant false alarm rate (CFAR) detection, Doppler processing, a super-resolution algorithm, spectral cleaning, or a windowing optimization.

19. Wireless circuitry comprising:

a first antenna;

a second antenna; and one or more processors communicatively coupled to the first antenna and the second antenna and configured to convey, using one of the first and second antennas, wireless communications data with a wireless base station according to a wireless communication standard, transmit, using the first antenna, a waveform that is compliant with the wireless communication standard, receive, using the second antenna, a reflected version of the waveform transmitted by the first antenna, detect a range to an external object based at least on the reflected version of the waveform received by the second antenna, generate a set of orthogonal frequency division multiplexing (OFDM) symbols associated with the waveform transmitted by the first antenna, allocate a resource grid that is compliant with the wireless communication standard based on the set of OFDM symbols, and convert the allocated resource grid into the waveform transmitted by the first antenna.

20. The wireless circuitry of claim 19, wherein the communication standard comprises a 3GPP 5G communication standard.

\* \* \* \* \*